US006292857B1

(12) United States Patent
Sidoroff et al.

(10) Patent No.: US 6,292,857 B1
(45) Date of Patent: Sep. 18, 2001

(54) METHOD AND MECHANISM FOR COORDINATING INPUT OF ASYNCHRONOUS DATA

(75) Inventors: Donald D. Sidoroff, Woodinville; Yongqi Yang, Bellevue, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/870,028

(22) Filed: Jun. 5, 1997

(51) Int. Cl.[7] .............................. G06F 3/00; G06F 17/21
(52) U.S. Cl. ......................... 710/54; 707/541; 382/187; 382/189; 704/231
(58) Field of Search ............................. 707/541; 345/340, 345/347, 156, 157, 163, 168–173; 382/181, 186–189, 310–311; 704/200, 231; 710/1, 5, 40, 44, 46, 47, 48, 52, 54, 57, 67, 73, 260, 263; 712/167, 169

(56) References Cited

U.S. PATENT DOCUMENTS

| 5,231,691 | * | 7/1993 | Yasuda ................................ 704/200 |
| 5,455,901 | | 10/1995 | Friend . |
| 5,758,184 | | 5/1998 | Lucovsky . |
| 5,760,773 | * | 6/1998 | Berman et al. ...................... 345/347 |
| 5,784,615 | | 7/1998 | Lipe . |
| 5,801,696 | | 9/1998 | Roberts . |
| 5,823,788 | | 10/1998 | Lemelson et al. . |
| 5,864,635 | * | 1/1999 | Zetts et al. ............................ 382/187 |
| 5,903,667 | * | 5/1999 | Kuzunuki et al. .................... 382/187 |
| 5,946,499 | * | 8/1999 | Saunders ................................ 710/73 |
| 5,969,711 | * | 10/1999 | Menzel ................................. 345/179 |
| 5,974,385 | * | 10/1999 | Ponting et al. .................... 710/73 X |
| 6,034,685 | * | 7/2000 | Kuriyama et al. ............... 345/179 X |
| 6,128,007 | * | 6/1998 | Seybold ................................ 345/179 |

* cited by examiner

Primary Examiner—Joseph H. Feild
(74) Attorney, Agent, or Firm—Michalik & Wylie, PLLC

(57) ABSTRACT

A method and mechanism for handling user input. Messages corresponding to the user input are placed in a message queue. An input handler differentiates between messages in the queue, such as handwritten character strokes, which are to be handled in real time, and ordered messages, such as characters, cursor movement and editing commands, which are to be handled in a synchronized order of input. The input handler handles each ordered message only after completion of any previous ordered message, while real time messages are handled regardless of the completion status of the ordered messages. In this manner, handwritten character strokes are immediately written to the display area. Ordered messages, which may correspond to handwritten characters having a recognition delay time associated therewith, are handled in the same order as input by the user regardless of any recognition delay time.

24 Claims, 6 Drawing Sheets

```
[Send box 40 to Recognizer]
IDC_BackSpace
WM_LButtonDown (box 42)
WM_MouseMove (box 42)
        :
WM_MouseMove (box 42)
WM_LButtonUp (box 42)
WM_LButtonDown (box 42)
WM_MouseMove (box 42)
        :
WM_MouseMove (box 42)
WM_LButtonUp (box 42)
```
← 50

FIG. 3C

```
IDC_BackSpace
WM_LButtonDown (box 36)
WM_LButtonUp (box 36)
WM_LButtonDown (box 40)
WM_MouseMove (box 40)
        :
WM_MouseMove (box 40)
WM_LButtonUp (box 40)
```
← 50

FIG. 3D

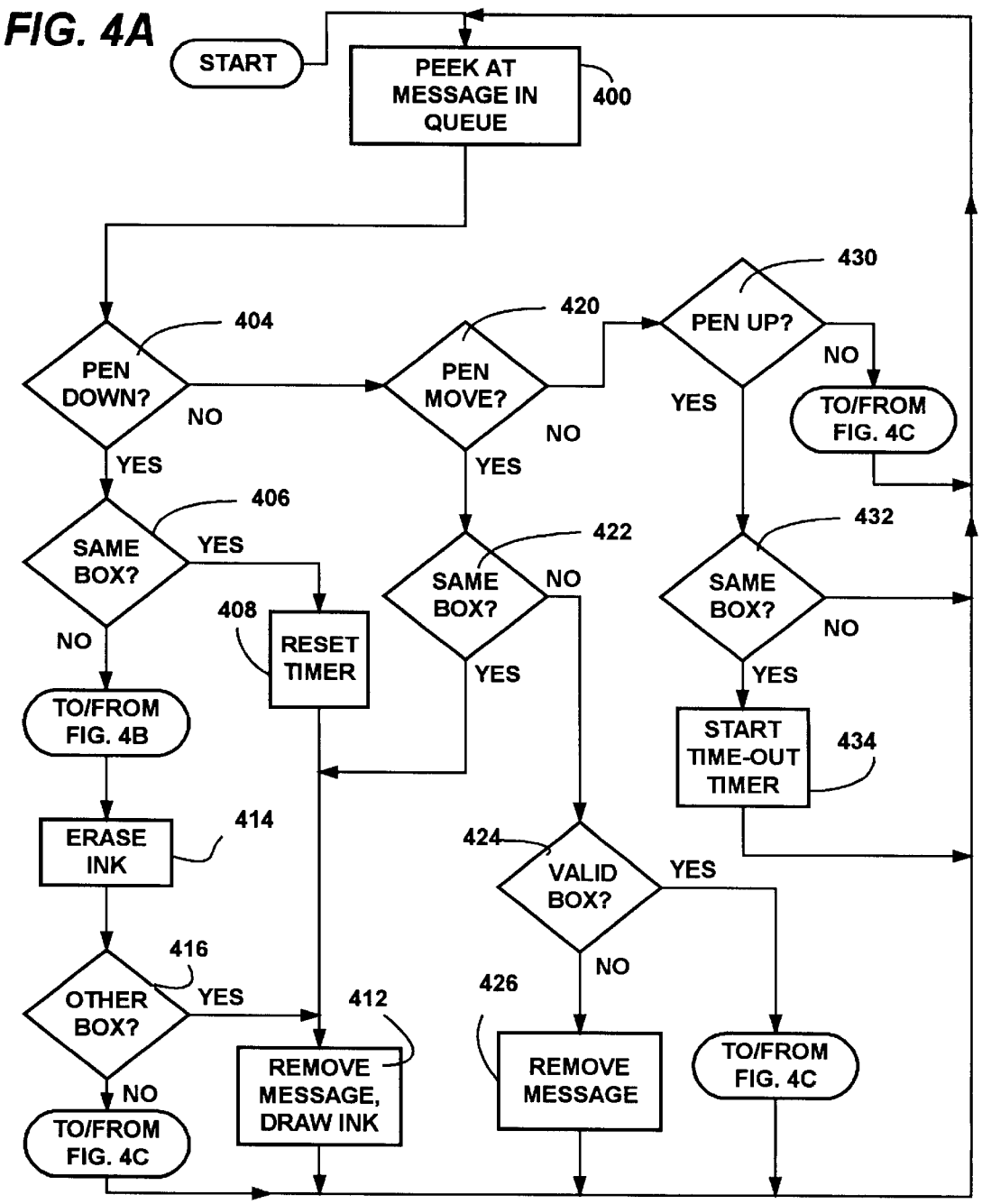

METHOD AND MECHANISM FOR COORDINATING INPUT OF ASYNCHRONOUS DATA

FIELD OF THE INVENTION

The invention relates generally to computer systems, and more particularly to a method and mechanism for handling user input into a computer system from computer input devices.

BACKGROUND OF THE INVENTION

Computer users input information into the computer from various input devices, including a keyboard, mouse and pen input device. Problems arise when the processing of one type of input is slow relative to another. In particular, when processing handwritten characters input via the pen device, the handwriting recognition (translation) process takes a relatively substantial amount of time compared to other types of input, including other types of pen-initiated messages. Indeed, while one or more characters are being translated, the user can input additional information which is intended to impact the pending character or characters, but may wind up operating on others.

By way of example, if a user writes the string "ABC" into a handwriting input area and then enters the BackSpace key, (either via a conventional keyboard or by touching the pen to a displayed, virtual BackSpace key), the BackSpace key message may be received and handled before the "C" is done processing. If this timing problem occurs, the "B" character, and not the "C" character, is erased, because information is handled in the order it is processed rather than the order it is input. Similarly, if the user writes a string such as "DEF," and then, while the "F" is being recognized, moves the input focus (cursor) to between the "D" and "E," the string will be recognized by the application program as "DFE" instead of the intended "DEF."

The reason that the input is handled in the order processed rather than the order received is that it is even less desirable to wait until character recognition is complete before handling subsequent input information. More particularly, if the user writes a stroke with a pen but does not receive rapid visual feedback on the pen input display area, (because a previously-input character is still being translated), the user tends to rewrite the stroke, adding another, unwanted stroke to the input queue. Having the pen temporarily appear to "run out of ink" and then suddenly recover is extremely frustrating to the user. Even more frustrating, however, is to have the system not only appear to recover at some later stroke, but restore any previous strokes that were not displayed earlier.

As a result, one approach to these above problems has been to ignore further input until the previous character is recognized. This avoids the stroke-rewriting problem, but slows the user down to the speed of recognition and thus frequently makes it appear as if the application is temporarily frozen. An alternative approach has been to accept the above-described timing problems (and other related problems) and hope the user adapts to the system by not providing further input until after appropriate visual feedback, such as indicative of complete character recognition, is received. In short, both approaches are poor tradeoffs, as the former makes the system look and act inferior, while the latter forces the user to learn and follow undesirable rules else risk inputting something other than intended.

OBJECTS AND SUMMARY OF THE INVENTION

Accordingly, it is a general object of the present invention to provide an improved method and mechanism for handling user input.

In accomplishing that object, it is a related object to provide a method and mechanism that handles user input without delaying visual feedback of the input to the user.

Another related object is to provide the method and mechanism as characterized above that handles user input in the order that the user enters the input.

Yet another object is to provide the above method and mechanism for dealing with pen input, and particularly the input of handwritten characters and editing commands related thereto.

Another object is to provide the method and mechanism as characterized above that is reliable, flexible and extensible to future types of user input.

Briefly, the present invention provides a method and mechanism for handling user input, wherein messages corresponding to user input information are placed into a message queue. An input handler differentiates between real time messages (such as handwritten character strokes) which are to be handled in real time, and ordered messages (such as characters, cursor movement and editing commands) which are to be handled in a synchronized order of input. The input handler handles each ordered message only after completion of any previous ordered message, while real time messages are handled regardless of the completion status of the ordered messages.

Other objects and advantages will become apparent from the following detailed description when taken in conjunction with the drawings, in which:

BRIEF DESCRIPTION OF THE DRAWINGS

FIGS. 3A–3D represent the exemplary contents of a message queue at various times reflecting various states; and FIGS. 4A–4C comprise a flow diagram representing the general steps taken to handle various messages in accordance with one aspect of the present invention.

DETAILED DESCRIPTION OF THE PREFERRED EMBODIMENT

Figure 1:
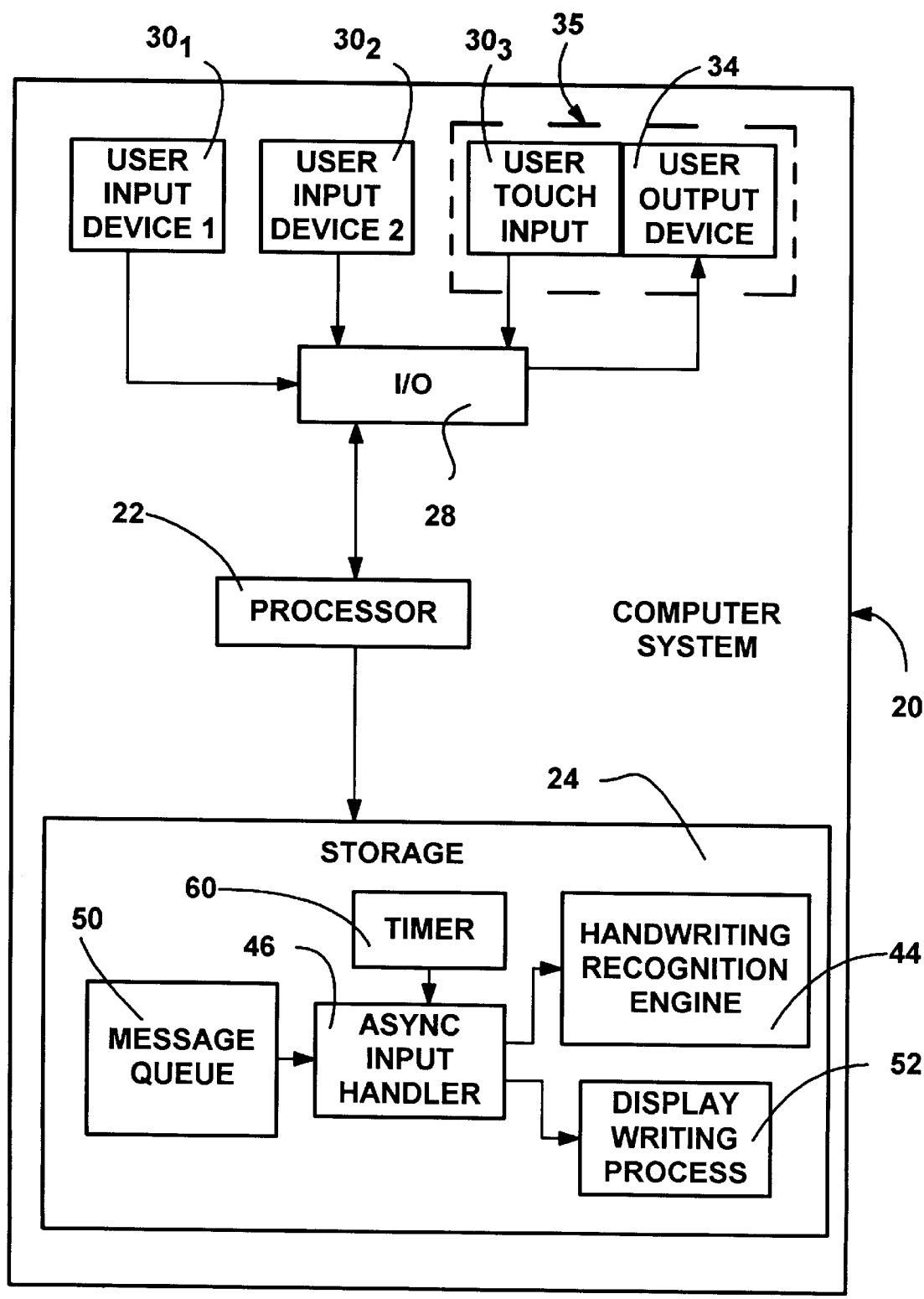
FIG. 1 is a block diagram representing a computer system into which the present invention may be incorporated.

Turning to the drawings and referring first to FIG. 1, there is shown a computer system generally designated 20 into which the present invention may be incorporated. The computer system 20 includes a processor 22 operatively connected to storage 24, the storage including random access memory (RAM) and non-volatile storage such as a hard disk-drive, optical drive or the like. As can be appreciated, the non-volatile storage can be used in conjunction with the RAM to provide a relatively large amount of virtual memory via well-known swapping techniques.

The processor 22 also connects through I/O circuitry 28 to one or more input devices $30_1$–$30_3$, such as a keyboard and/or a pointing device such as a mouse. The system 20 preferably includes means for inputting pen-based information, including handwritten characters, such as a pen and/or pen-sensitive (e.g., touch-sensitive) input device $30_3$. The system 20 also includes at least one local output device 34 connected to the I/O circuitry 28 for communicating information, such as via a graphical user interface, to the user of the system 20. The output device 34 may include a liquid crystal display screen or the like integrated with the pen-input device $30_3$ which taken together can be considered a pen-sensitive screen 35 (FIG. 2).

A preferred system 20 is a hand-held personal computing device running on the Windows CE operating system loaded in the storage 24. Other preferred systems include tablet-based desktop personal computers running under the Windows 95 or Windows NT operating systems. At least one application program such as a word processing program may also be loaded into the storage 24.

Figure 2:
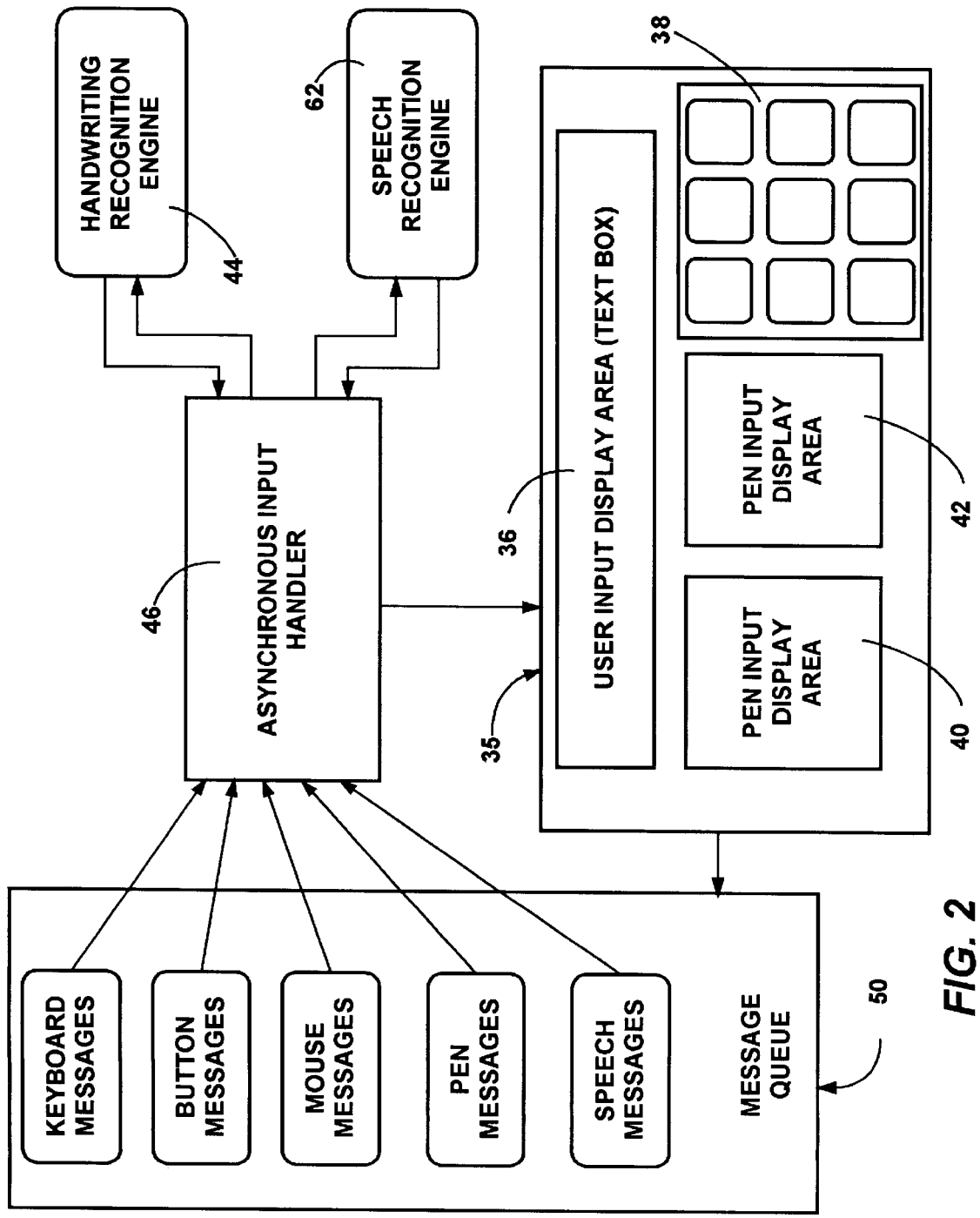
FIG. 2 is a block diagram illustrating various components used to handle input data in accordance with one aspect of the present invention.

As shown in FIG. 2, the pen-sensitive screen 35 includes a visible text buffer 36 for displaying text characters that have been input into the system 20. For example, if the character is a handwritten character, the system 20 recognizes the character from among a set of possible characters, (e.g., Unicode code points), and displays the recognized character in the text buffer 36 in an appropriate font and font size.

Within the text buffer 36, the user may adjust the input focus by adjusting the position of a cursor or the like therein, generally by touching the pen to the desired cursor location and/or dragging the pen to mark text. The screen 35 preferably includes a button input area 38 (FIG. 2), which may provide a virtual keyboard through which the user may directly input characters, character-based editing commands and so on. For example, the buttons may represent characters, such that when contacted by a pen, the character is input into the system as if it was typed by the user on a conventional keyboard. In addition, the user may use such buttons to enter editing commands, such as BackSpace or Enter commands, by touching the screen at an appropriately displayed button in the area 38.

As shown in FIG. 2, for inputting handwritten characters, the display/touch-sensitive screen 35 typically includes two or more pen input display areas 40, 42. In general, the pen input display areas 40, 42 are used to receive handwritten characters from the user in the form of strokes. The user typically alternates character input between the boxes 40, 42. For example, a user will write in the first box 40, with the system echoing the pen movement on the screen by darkening or coloring the contacted areas, giving the user the impression that the pen has ink therein. When the user begins writing in the second box 42, it is assumed that the character in the first box 40 is complete. The stroke information from the first box 40 is then sent to a handwriting recognition engine 44, and the displayed strokes (ink) in the first box 40 are erased. Similarly, the same actions occur in the second box 42, i.e., the strokes are sent for character recognition thereof and the second box 42 erased upon a detection that the user is writing in the first box 40. A time-out when no pen activity is detected will also be treated as a completed character, as will a direct command from the user, entered via the button input area 38 or the like indicating that the user is finished with a character.

In accordance with one aspect of the present invention and as best represented in FIG. 2, an asynchronous input handler 46 is provided for coordinating the various input events. The asynchronous input handler 46 coordinates all events with respect to the state of the recognition engine 44 (or engines) and the state of the pen-sensitive screen 35 in a manner that maintains the order of events intended by the user, while handling certain events in real time. More particularly, the asynchronous input handler 46 differentiates between certain pen events and other types of events to maintain the order of completed character and other user-command input while handling the display of electronic ink in real time. As a result, the system 20 rapidly updates the input areas 40, 42 and thus does not appear to freeze while the handwriting or other (e.g., speech) recognition is taking place, yet the order of user input is maintained in the order intended by the user.

To accomplish the above-described coordination, the system 20 places messages corresponding to input from any of the user input devices $30_1$–$30_3$ into a message queue 50, preferably a Windows® message queue. For example, pen down events, pen move events and others are placed as messages in the message queue 50. It should be noted that in certain systems, there is no distinguishing between pen and mouse events, e.g., a pen down is treated the same as a left button down event, a pen move as a mouse move, and a pen up as a left button up. Similarly, it should be noted that the system 20 may preprocess some of the messages, such as keyboard messages and button messages from the button input area 38, and convert those messages into character or editing command messages which are then placed in the message queue 50. For example, a pen down event on a displayed BackSpace button in the button input area 38 may cause an IDC_BackSpace (Index Dialog Control) message to appear in the message queue 50. Alternatively, a button down event, at screen coordinates corresponding to the BackSpace key, may be converted to a BackSpace command by the asynchronous input handler 46 as needed. Note that some hand-held devices use a "Delete" key to delete the previous character. In any event, button and pen/mouse move events, characters and editing commands appear as messages in the message queue 50.

In keeping with the invention, the asynchronous input handler 46 examines and otherwise handles all such messages. Thus, for example, pen movements, detected in the pen input display areas 40, 42 by a pen movement detection process or the like, do not directly result in ink being drawn on the pen-detected locations. Instead, the ink is indirectly drawn as the asynchronous input handler 46 identifies pen messages in the message queue at the appropriate pen input coordinates, and sends corresponding drawing messages to the user output device 34 (i.e., to a display writing process 52 which writes to the pen input display areas 40 or 42). Similarly, the hardware and/or software that detects pen movement does not send pen strokes to the handwriting recognition engine 44, but instead places pen movement information as messages in the message queue 50.

In accordance with another aspect of the invention, the asynchronous input handler 46 differentiates between various types of messages. Those messages which are to be handled in real time, such as those resulting in ink being written to the areas 40 and 42, are processed without delay. Those messages which are to be handled in a specific order, such as character and character editing commands, are processed as soon as the previous such message has been handled and completed. By way of example, a directly input BackSpace command character is not handled until the preceding character has been completely handled. Depending on how the preceding character was input, this may require waiting until the handwriting recognition engine 44 has completed its recognition process. As can be appreciated, it ordinarily takes substantially longer to translate strokes into a character than to receive a code from input hardware that directly identifies a key.

In keeping with the invention, the handwriting recognition engine 44 runs in a separate thread and communicates with the asynchronous input handler 46 through a semaphore protected area. This allows the handwriting recognition engine 44 to run in parallel with the ink and text displays from the asynchronous input handler 46, thus enabling real-time messages to be handled while a recognition is pending.

Turning now to an explanation of the operation of the invention with particular reference to the flow diagram of FIG. 4, a plurality of user input messages are received in the message queue 50 as represented in the diagrams of FIGS. 3A–3D. In the following examples, for simplicity it is assumed that only certain types of events occur, including pen down, pen movement and pen up events in the user input boxes. These pen events write the characters "ABC" followed by a keyboard key or button entry which directly enters a BackSpace message. Then, a handwritten "E" is input to the system. In other words, the user intends to write "ABE" but accidentally writes a "C" after the "B" whereby the "C" is to be deleted by the BackSpace command, and the "E" written thereafter.

As the user starts writing the letter "A" in the pen input display box 40 (FIG. 2), a pen down message is received (as a left mouse button down event) in the message queue 50, followed by a series of movement messages and a pen up (WM_LButtonUp) message. Note that depending on the circumstances, each message may be handled and removed from the queue 50 before the next message is ever placed in the queue 50. However for purposes of simplicity and clarity, each of FIGS. 3A–3D represent a plurality of event-driven messages in the message queue 50. Moreover, rather than show actual coordinates, the identity of the box (as numbered in FIG. 2) wherein the pen event took place is shown in parentheses in FIGS. 3A–3D.

At step 400 of FIG. 4, the asynchronous input handler 46, which is in a message loop, peeks in the message queue 50 (via the Windows PeekMessage() function or the like) and examines the message, if any. As generally shown in FIG. 4, the asynchronous input handler 46 handles each pen (mouse) message based on the type of message received, the coordinates where the pen message was originated, and the current state of the display input areas. For example, with the pen down event that starts the handwritten "A" character, the asynchronous input handler 46 knows via the coordinates that a pen down has occurred in the left user input box 40 (FIG. 3A) and that no other strokes have yet been written in the right input box 42. Accordingly, step 404 branches to step 406 to determine if the pen down was in the same input box. Because at this time the state of these display areas is empty, there is no previous stroke information to send to the handwriting recognition engine 44. Accordingly, the asynchronous input handler 46 treats the pen down message as the start of a stroke in the same box without passing any information to the handwriting recognition engine 44, i.e., step 406 branches to step 408. At step 408, a timer 60 is reset (described below), and at step 412 the message is removed (e.g., via the Windows GetMessage() function) from the message queue 50 and ink is caused to be drawn at the appropriate coordinates in the user input box 40.

Figure 3A:
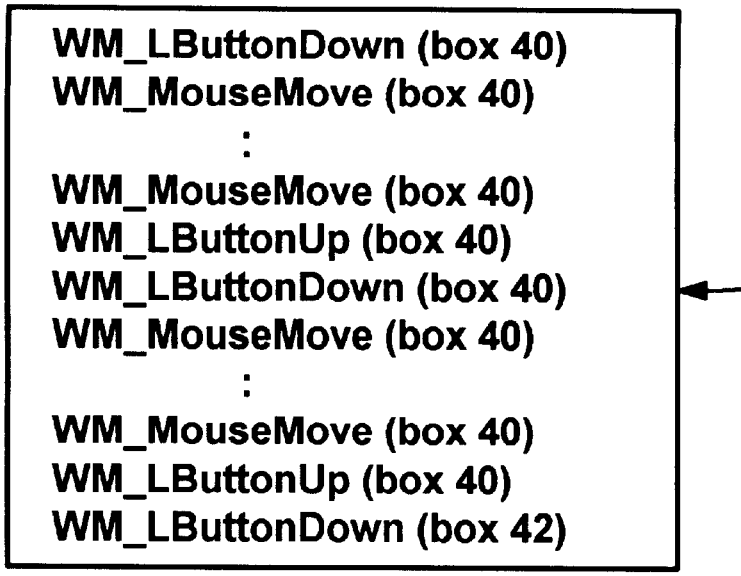

The process then loops back to step 400 to peek at the next message, if any. Since the user is inputting a stroke, the user next moves the pen, generating a series of pen move messages as also represented in FIG. 3A. Each such message is detected by the asynchronous input handler 46 in step 420 as a pen move message, and, since the movement is in the same box 40, at step 412, each message is removed from the message queue 50 and ink drawn. After each move event is handled, the process loops back to step 400 to peek at the next message, if any. Note that in the present example, the user keeps the pen within the boundaries of the user input box 40, and the pen continues to move (step 420) until the user lifts the pen. To ensure that the strokes stay within the box while allowing the user to safely write to the very edge of the box, coordinates are trimmed to the nearest edge of the current box. Thus, once a stroke starts in a box, it will finish in that box, and the user will not inadvertently terminate a character by straying from the box boundaries.

Ultimately, when the user lifts the pen, a pen up (LbuttonUp) message (FIG. 3A) is detected at step 430, whereby at step 432 the asynchronous input handler 46 tests the coordinates of the pen-up event to determine if the action occurred in the same input box 40. Likewise, an input from the keyboard, received in a message when the pen is down, will terminate the current stroke. In either case, the asynchronous input handler 46 considers such an event to be the completion of a stroke. Consequently, at step 434, the asynchronous input handler 46 removes the pen-up message from the queue 50 and starts the time-out timer 60.

In general, the time-out timer 60 operates to send any input in the box 40 (or the box 42) to the character recognition engine 44 if the user has input strokes, but after a period of time has neither written in the other box nor directly commanded the system to recognize the character. As will become apparent, a time-out event is treated as if the user either directly commanded the system to recognize a character, or began writing in the other box (as described with reference to FIG. 4B). In the present example, however, the user continues to write in the input box 40 before the time out event occurs.

Thus, step 404 detects another pen down event in the same box 40, whereby step 406 branches to step 408 which resets the timer 60. Note that the timer 60 is reset because such an action in the same box is considered to be the start of another stroke, and thus the user assumed to be still writing the same character. In the present example, as evident from FIG. 3A, the user continues to draw the new stroke, (i.e., move the pen), which is handled as described above with reference to steps 420, 422 and 412. Eventually, the user lifts the pen (steps 430–434) and finishes writing the first character.

Figure 3B:
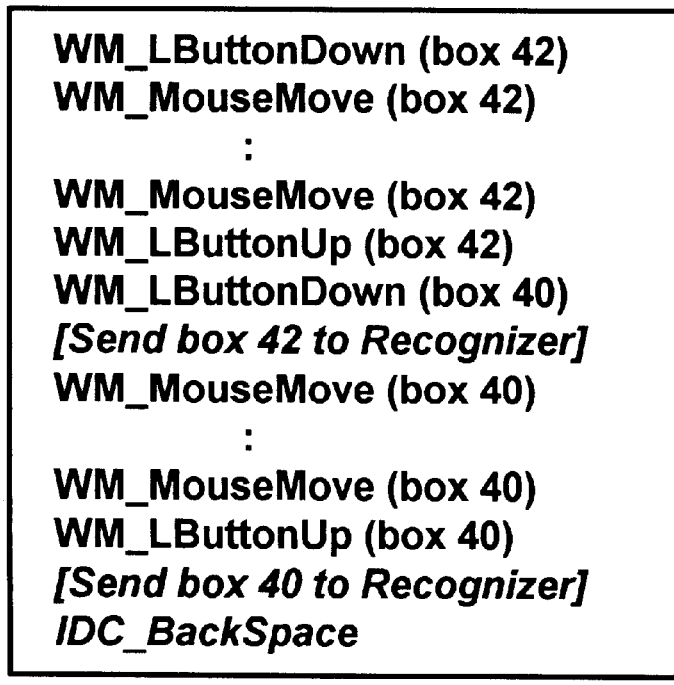
Figure 4B:
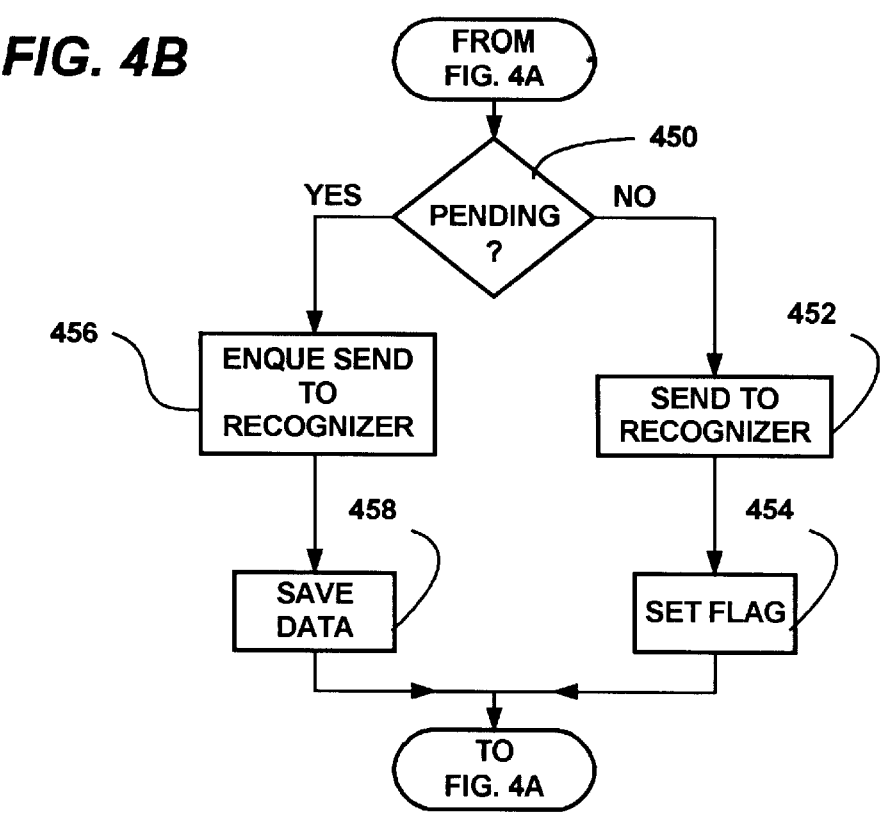

When the user puts the pen down in the next box 42, as shown in the last message of FIG. 3A, (which is also the first message of FIG. 3B), step 406 detects the new screen area and as a result branches to step 450 of FIG. 4B. Because the user has begun to write in something other than the same box 40, the asynchronous input handler 46 considers the previous character to be finished by the user. Note that if the pen down is in an invalid area, another action may alternatively be taken, such as ignoring such an undefined pen down. In any event, the next message is in the other box 42, and thus the process executes step 450.

At step 450, a determination is made as to whether a recognition is pending in the handwriting recognition engine 44. A flag, which is set by the asynchronous input handler 46 when strokes are sent for recognition and reset by the handwriting recognition engine 44 when the recognition is complete, is used for this test. At this time, no recognition is pending, and thus step 452 sends the stroke information from box 40 to the handwriting recognition engine 44, after which step 454 sets the recognition flag. The process then returns to step 414 which erases the ink in the old box 40 and tests the coordinates of the new pen down to determine how to handle the event. More particularly, if the pen down was in the other input box 42, then ink is to be drawn and the message removed. If the pen down is elsewhere, other actions may be taken as described in more detail below.

In the present example, the user is writing a "B" in the second input box 42. Accordingly, the pen down event (WM_LbuttonDown) in this box 42 is detected in the queue 50 (FIG. 3B) at step 416, whereby the process branches to step 412. Step 412 removes this message from the queue 50 and draws ink at the pen (button) down coordinates within the box 42. As can be readily appreciated, the subsequent pen move events and pen up event in this box 42, as shown in FIG. 3B, are handled as described above with reference to steps 420–426 and 430–434, respectively.

The user continues by beginning to write a "C" in the first box 40. Again, step 406 branches the process to step 450 of FIG. 4B. This time, however, the handwriting recognition engine 44 is still recognizing the "A" character, and thus the state of the "pending" flag causes the process to branch to step 456. Step 456 enqueues a send message or the like (e.g., via the Windows PostThreadMessage() function) into the message queue 50, while step 454 saves the stroke data (e.g., as a bitmap or other appropriate format as required) for later use by the handwriting recognition engine 44. The input box 42 is erased at step 414, and steps 416 and 412 are executed to begin drawing the "C" ink. In keeping with the invention, this "send-to-the-handwriting recognition engine 44" message, shown in italics in FIG. 3B, is not removed from the message queue 50. Instead, this message will be removed and handled when the handwriting recognition engine 44 clears the flag to indicate that no character is pending.

The process continues handling the "C" stroke input in the message box 40, as shown in FIG. 3B, by handling the pen move messages to draw ink (step 412) in the manner described above. For purposes of the present example, while the "C" is being input, the handwriting recognition engine 44 returns with the "A" having been recognized (or returns a set of possible alternatives including the "A"). The flag change can be detected with a simple test before beginning the steps of FIG. 4A. When detected, any messages left in the queue 50 are handled and removed until the flag is again set for another pending recognition, or until no messages remain.

Thus, the "A" input is sent to the appropriate buffer or program (e.g., word processor) as if it was any other keyed input. Also, the "A" may be displayed in the text box 36. Then, the saved "B" stroke information is sent to the handwriting recognition engine 44 and the flag is again set to indicate the pending recognition.

The user then enters a BackSpace, such as via the keyboard 30$_1$, or button input area 38, to erase the completed "C" character. At this time, the asynchronous input handler 46 posts a "send C data to handwriting recognition engine 44" message into the queue 50. As described above, the system may write a BackSpace message into the queue 50 instead of the pen down message and its coordinates. If not, however, the asynchronous input handler 46 can take care of the conversion. In any event, however, a BackSpace message remains in the queue 50 following the "send C" message. In accordance with one aspect of the invention, the BackSpace is not yet handled because at least one character is still pending in the handwriting recognition engine 44. Note that as described below, in some implementations (including Microsoft IME 98), the BackSpace message is a special case that can be recognized and used by the asynchronous input handler 46 to terminate the ongoing recognition of a handwritten character directly preceding the BackSpace message. For purposes of the present example, it is assumed that this enhancement is not yet active to demonstrate the handling of ordered messages provided by the present invention. As can be appreciated, however, even with the enhancement, the handling of ordered messages in accordance with the present invention provides advantages in many other situations, e.g., other keystroke characters or commands are not handled before any ongoing recognitions are complete, a Backspace does not cancel an ongoing recognition two or more characters prior thereto, and so on.

When the "B" recognition is complete, the process next sends the "C" to the handwriting recognition engine 44. During the pending recognition, the user begins to write "E" strokes into the input box 42. These events cause ink to be drawn immediately as described above, while the other, ordered messages are left in the queue until all preceding ordered messages are handled.

In the present example, once the "C" is returned by the handwriting recognition engine 44, the flag is cleared and the subsequent BackSpace is handled without delay. Thus, the "C" is erased and the "E" character, when recognized, will be properly written to the text box 36 following the "AB" characters. As described above, the process maintains the order intended by the user while not delaying the writing of ink into the user input display area boxes 40, 42.

Figure 4C:
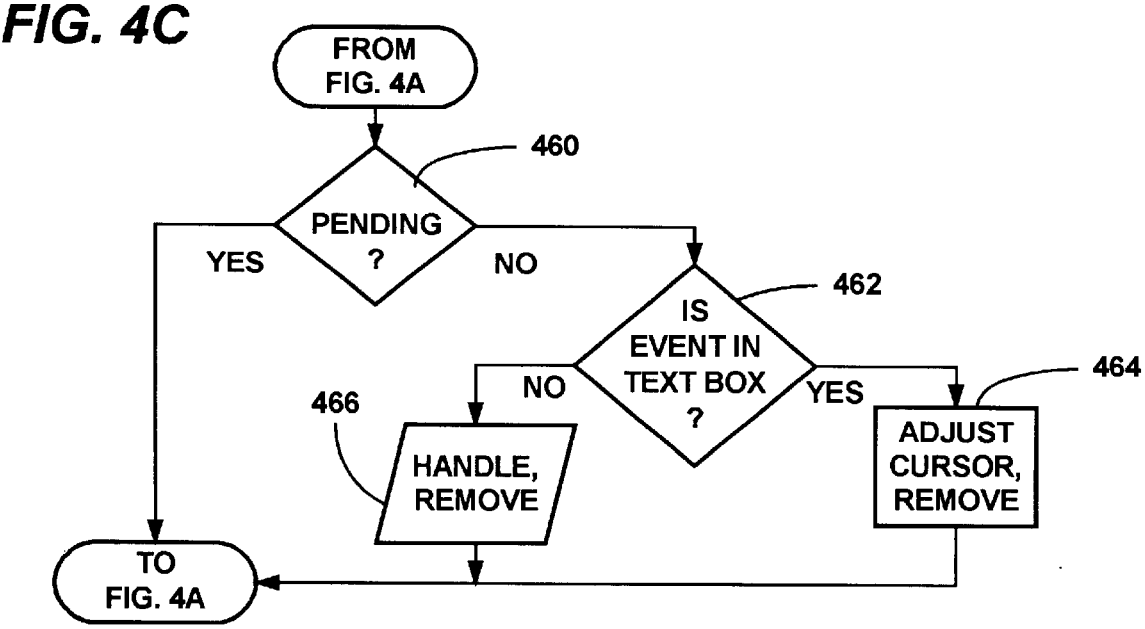

If no recognition is pending, the process works in the same general way except that all messages, including pen events, are handled immediately. This is represented in FIG. 4C, where if no recognition is pending at step 460, the process branches to step 462. As detected by step 462, pen events in the text box 36 are used to move the cursor, mark text and so on as represented by step 464, and the message is removed. Other, non-text box events such as BackSpace key inputs, typed characters and so on are removed and handled immediately (e.g., displayed in the text box and/or sent to a buffer or other message queue of a program) as represented by step 466. Note that instead, if a recognition is pending, step 460 leaves such other event messages in the message queue 50 as described above.

Although not necessary to the invention, it should be noted that the asynchronous input handler 46 alternatively can detect a BackSpace message following a "send to recognizer" message that has not yet been sent to the handwriting recognition engine 44. In such an event, the asynchronous input handler can cancel the two messages, since regardless of the resulting character, when recognized, it will be erased. Likewise, detection of a succeeding BackSpace by the asynchronous input handler 46, while a recognition is pending, alternatively can result in the asynchronous input handler 46 communicating with the handwriting recognition engine 44 to halt the pending recognition process for the given character, thereby further enhancing system performance.

As shown in FIG. 3D, a pen down event may also be located in the text box 36. In the present example, the user thereafter lifts the pen up without dragging it, intending that the input focus (cursor) be moved to an appropriate location in the text box 36 such as between the "A" and "B" characters. However, in keeping with the invention, such a movement is not allowed by step 460 until all preceding synchronous events have been handled. In other words, if a character recognition is pending at step 460, the asynchronous input handler 46 leaves the pen down, pen up commands in the queue 50, for sequential processing after all preceding results from the handwriting recognition engine 44 have been handled. For example, if the user has handwritten "ABE" into the system, and while the "E" is being recognized, the user clicks between the "A" and the "B" and writes a "D" character, the insertion point (input focus) will not appear to change until the "E" appears at the end. At that time, the "D" will appear between the "A" and the "B" in the text buffer 36. Without waiting for the completion of the recognition, the result would have been the erroneous string "AEDB" instead of the intended string "ADBE." Although the user may have to wait a short while before receiving visual feedback, the order is preserved.

In the above-described manner, the asynchronous input handler handles user input both where no recognitions are pending, or where one or more recognitions are pending. The order is maintained in the intended order input by the user, yet there is no delay in receiving visual feedback of stroke input. As can be readily appreciated, the asynchronous input handler 46 does not simply differentiate between pen events and character input, but takes appropriate actions based on the type of message, the accompanying coordinates, if any, and the state of the system.

In addition to the recognition of handwritten characters, the present invention is flexible and adaptable to all types of input including speech input. More particularly, speech input, whether output as words, syllables and/or characters, also has a recognition time associated therewith. During this recognition time, other user input such as handwritten character strokes, keyboard input and other speech is handled in the order entered by the user. To this end, ordered messages are left enqueued if a recognition flag is pending, while real time messages such as those reflecting stroke or speech input are handled immediately.

As can be seen from the foregoing detailed description, there is provided an improved method and mechanism for handling user input, which handles user input with selected visual feedback of the input to the user. The method and mechanism handles user input in the order that the user enters the input, including the input of handwritten characters and editing commands related thereto. The method and mechanism is reliable, flexible and extensible to future types of user input.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. In a computer system, a method of handling user input, comprising, placing messages corresponding to user input information into a message queue, differentiating between real time messages in the queue which are to be handled at least in part in real time and ordered messages in the queue which are to be handled in a synchronized order of input, processing the ordered messages in a synchronized order of input by handling each ordered message only after completion of the processing of any previous ordered message, and handling at least in part the real time messages while awaiting completion of processing of an ordered message.

2. The method of claim 1 wherein the user input includes handwritten character information, wherein messages corresponding to the handwritten character information are placed as ordered messages in the message queue, and wherein processing each ordered message includes providing the character information to a handwriting recognition engine.

3. The method of claim 2 wherein the user input includes keystroke character information from a physical or virtual keyboard.

4. The method of claim 1 wherein the user input includes speech information, wherein messages corresponding to the speech information are placed as ordered messages in the message queue, and wherein processing each ordered message includes providing the speech information to a speech recognition engine.

5. The method of claim 1 wherein handling each ordered message includes polling the completion status of the processing of the previous ordered message.

6. The method of claim 1 wherein handling each ordered message includes receiving information indicative of the completion of the processing of the previous ordered message.

7. The method of claim 1 wherein the user input includes pen events for inputting character information, wherein messages corresponding to the pen events for inputting character information are placed as real-time messages in the message queue, and wherein handling the real time message includes causing display changes corresponding to the pen events.

8. The method of claim 1 wherein the user input includes a command to delete a previous character, and wherein the message corresponding to said command is a real-time message handled by canceling the recognition of the previous character.

9. The method of claim 1 wherein the user input includes a command to delete a previous character, and wherein the message corresponding to said command is an ordered message until a handwritten character previous thereto is being processed for recognition thereof, and a real-time message when the previous character is being processed for recognition thereof, the real time message handled by terminating the recognition of the previous character.

10. The method of claim 1 wherein the messages are placed into a single message queue.

11. A computer-readable medium having computer-executable instructions for performing the method of claim 1.

12. In a computer system, a mechanism for handling user input, comprising means for placing messages corresponding to user input information into a message queue, an input handler for differentiating between real-time messages which are to be handled at least in part in real time and ordered messages which are to be handled in a synchronized order of input, the input handler including means for detecting completion of a previous ordered message, and further including means for causing processing of the ordered messages in a synchronized order of input by handling each ordered message only after completion of processing of any previous ordered message and for handling at least in part the real time messages while awaiting completion of processing of an ordered message.

13. The mechanism of claim 12 further comprising means for inputting handwritten character information, wherein messages corresponding to the handwritten character information are placed as ordered messages in the message queue, and further comprising a handwriting recognition engine, wherein the means for causing processing of the ordered messages in a synchronized order of input by handling each ordered message includes means for providing the character information to the handwriting recognition engine.

14. The mechanism of claim 13 further comprising means for inputting keystroke character information from a physical keyboard.

15. The mechanism of claim 13 further comprising means for inputting keystroke character information from a virtual keyboard.

16. The mechanism of claim 13, wherein the means for detecting completion of a previous ordered message includes a flag having a state set by the handwriting recognition engine when recognition of character information is complete.

17. The mechanism of claim 12 further comprising means for inputting speech information, wherein messages corresponding to the speech information are placed as ordered messages in the message queue, and further comprising a speech recognition engine, wherein the means for causing processing of the ordered messages in a synchronized order of input by handling each ordered message includes means for providing the speech information to the speech recognition engine.

18. The mechanism of claim 12 wherein the user input includes pen events for inputting character information, wherein messages corresponding to the pen events for inputting character information are placed as real-time messages in the message queue, and wherein the means for handling at least in part the real time messages includes means for causing display changes corresponding to the pen events.

19. In a computer system, a method of handling input from a user, comprising:
   placing messages corresponding to keystroke input and messages corresponding to pen events, including pen event messages related to handwritten characters, into a message queue;
   determining from the messages in the message queue when the user has finished a character, and when the character is finished, sending information corresponding to the character to a handwriting recognition engine;
   awaiting a result from the handwriting recognition engine, and while awaiting said result, determining which pen event messages are caused by the writing of a handwritten character stroke and handling those messages by outputting information corresponding to the handwritten character stroke to a display; and
   handling any message in the message queue while a result from the handwriting recognition engine is not pending.

20. The method of claim 17 wherein the messages are placed into a single message queue.

21. A computer-readable medium having computer-executable instructions for performing the method of claim 17.

22. A system for providing output from user input, comprising, a message queue for receiving messages corresponding to real time events that are to be handled at least in part in real time and ordered events that are to be handled in a synchronized order of input, a recognition engine, an output mechanism, and an input handler, the input handler examining the message queue to differentiate between the real time events and the ordered events therein to provide at least some events to the recognition engine and to output real-time information corresponding to the real-time events to the output mechanism while awaiting a result of recognition from the recognition engine.

23. The system of claim 22 wherein the user input includes handwritten character information, and wherein the input handler provides handwritten character data to the recognition engine.

24. The system of claim 22 wherein the user input includes speech information, and wherein the input handler provides speech data to the recognition engine.

* * * * *